US010927040B2

(12) United States Patent
Ozanam et al.

(10) Patent No.: US 10,927,040 B2
(45) Date of Patent: Feb. 23, 2021

(54) METHOD FOR OBTAINING MARKED GLASS PLATES

(71) Applicant: SAINT-GOBAIN GLASS FRANCE, Courbevoie (FR)

(72) Inventors: Cécile Ozanam, Palaiseau (FR); Patrick Gayout, Villemomble (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/463,758

(22) PCT Filed: Nov. 22, 2017

(86) PCT No.: PCT/FR2017/053198
§ 371 (c)(1),
(2) Date: May 23, 2019

(87) PCT Pub. No.: WO2018/096258
PCT Pub. Date: May 31, 2018

(65) Prior Publication Data
US 2019/0389767 A1    Dec. 26, 2019

(30) Foreign Application Priority Data

Nov. 24, 2016  (FR) .................................. 1661449

(51) Int. Cl.
*G06K 7/14* (2006.01)
*C03C 23/00* (2006.01)
(Continued)

(52) U.S. Cl.
CPC .......... *C03C 23/0025* (2013.01); *C03B 18/02* (2013.01); *C03B 25/04* (2013.01); *C03C 15/00* (2013.01); *G06K 7/1417* (2013.01)

(58) Field of Classification Search
CPC ..... C03C 23/0025; C03C 15/00; C03B 18/02; C03B 25/04; G06K 7/1417; G06K 1/12; G06K 1/126
See application file for complete search history.

(56) References Cited

U.S. PATENT DOCUMENTS 5,801,356 A * 9/1998 Richman ................ B23K 26/18
219/121.68
6,696,157 B1 * 2/2004 David ..................... C03C 17/02
428/408
(Continued)

FOREIGN PATENT DOCUMENTS

WO    WO 97/39888 A1    10/1997
WO    WO 2007/033445 A1    3/2007
(Continued)

OTHER PUBLICATIONS

International Search Report as issued in International Patent Application No. PCT/FR2017/053198, dated Feb. 8, 2018.
(Continued)

*Primary Examiner* — Seung H Lee
(74) *Attorney, Agent, or Firm* — Pillsbury Winthrop Shaw Pittman LLP

(57) ABSTRACT

A method for obtaining a glass plate marked on a portion of one of its faces with code-forming symbols, includes a stage of etching the symbols by laser radiation on a glass sheet obtained by floating on a bath of molten tin, the etching being carried out on the face which has been in contact with the bath of molten tin.

20 Claims, 3 Drawing Sheets

(51) Int. Cl.
*C03B 18/02* (2006.01)
*C03B 25/04* (2006.01)
*C03C 15/00* (2006.01)

(56) References Cited

U.S. PATENT DOCUMENTS

| | | | |
|---|---|---|---|
| 7,608,294 B2* | 10/2009 | Seto | C03C 15/00 |
| | | | 427/109 |
| 8,707,736 B2* | 4/2014 | Gibson | B32B 17/10036 |
| | | | 65/94 |
| 9,378,445 B2* | 6/2016 | Stuck | B41M 5/262 |
| 9,512,026 B2* | 12/2016 | Hayashi | C03C 3/093 |
| 10,399,894 B2* | 9/2019 | Hotta | C03C 21/007 |
| 2016/0350566 A1* | 12/2016 | Ye | G06K 7/10732 |

FOREIGN PATENT DOCUMENTS

| | | | |
|---|---|---|---|
| WO | WO 2015/121548 A1 | 8/2015 | |
| WO | WO 2015/121549 A1 | 8/2015 | |

OTHER PUBLICATIONS

Modi, M. H., et al., "Ion irradiation damage on tin side surface of float glass," Nuclear Instruments and Methods in Physics Research B, vol. 239, No. 4, Jul. 2005, XP029236428, pp. 383-390.

Rainer, T., et al., "Colored inscription of float glass by $CO_2$ laser irradiation," Glastechnische Tagung, Jun. 1999, pp. 127-130, XP001117571.

\* cited by examiner

METHOD FOR OBTAINING MARKED GLASS PLATES

CROSS-REFERENCE TO RELATED APPLICATIONS

This application is the U.S. National Stage of PCT/FR2017/053198, filed Nov. 22, 2017, which in turn claims priority to French patent application number 1661449, filed Nov. 24, 2016. The content of these applications are incorporated herein by reference in their entireties.

The invention relates to the field of the marking of identification codes on glass plates.

It can be useful to mark glass plates by means of identification codes which can contain any type of information, for example a number used for identification of the glass plate, information related to the place or to the date of manufacture, and the like.

A method is known, from the application WO2015121549, for reading identification codes marked on the surface of glass plates close to the edge face of said plates, in which the reading is carried out via the edge face of said plates. Such a method makes possible rapid reading of codes in two dimensions, for example of the "Datamatrix" type, both on isolated plates and on stacked plates. The marking is, for example, carried out by means of a laser, which will etch the surface of the glass.

It is an aim of the invention to improve the reliability of the reading of the code via the edge face.

To this end, a subject matter of the invention is a method for obtaining a glass plate marked on a portion of one of its faces with code-forming symbols, comprising a stage of etching said symbols by means of laser radiation on a glass sheet obtained by floating on a bath of molten tin, said etching being carried out on the face which has been in contact with said bath of molten tin.

Another subject matter of the invention is a glass plate formed from a glass sheet obtained by floating on a bath of molten tin, said plate being marked with code-forming symbols etched by means of laser radiation on a portion of the face which has been in contact with said bath of molten tin. This subject matter is in particular a glass plate obtained by the method according to the invention.

Another subject matter of the invention is a method for reading, via the edge face, code-forming symbols marked on a glass plate according to the invention or on a glass plate obtained by the method of the invention.

The manufacture of float glass conventionally comprises the following stages:
- the floating stage, in which the molten glass resulting from a melting furnace is continuously poured onto a bath of molten tin, forming a continuous glass strip, which is gradually solidified,
- the annealing stage, in which the solidified glass strip is gradually cooled, first in an annealing oven known as "lehr" and then in the open air, in order to remove possible residual stresses liable to result in breakages,
- the cutting stage, in which the strip is cut in order to form large-sized glass plates typically of 6*3 m².

During the floating stage, one face of the strip was in contact with the bath of tin and is commonly known as "tin face" in the art and also in the present text. The other face, in contact with the atmosphere, is known as "atmosphere face". The inventors have been able to demonstrate that a laser etching carried out on the tin face of the glass sheet makes it possible to improve the quality of the image acquired via the edge face of the glass plates and thus to facilitate the reading of the codes. It is thus possible to reduce the size of the codes while retaining a good reading quality.

According to one embodiment, the method of the invention comprises, prior to the etching stage, a stage of floating on a bath of molten tin in order to obtain the glass sheet, followed by a stage of annealing said glass sheet, followed by a cutting stage, the etching stage being carried out during the annealing stage or between the annealing stage and the cutting stage.

In this embodiment, the etching is thus carried out on the moving glass strip, typically moving linearly. The rate of displacement of the strip is typically between 5 and 24 meters per minute, according to the draw of the furnace and the thickness of the glass strip.

According to another embodiment of the invention, the etching stage is carried out after at least one cutting stage, on glass plates of finished sizes. The etching is thus carried out after the cutting stage, indeed even after other subsequent cutting stages, optionally carried out in other places than the float glass manufacturing plant, for example in a plant for the conversion of the glass into glazings for the construction industry or motor vehicle industry. The final marked plate thus does not necessarily have the same dimensions as the plate on which the etching was carried out.

In this embodiment, the etching can thus be carried out on a static glass plate or on a moving glass plate, typically moving linearly. In the latter case, it generally concerns etching carried out when the glass plate is moving along a conversion line, for example a line for the deposition of thin layers, in particular by cathode sputtering, along a silvering line, along a line for the manufacture of laminated glazings, of multiple glazings, of tempered glazings, and the like.

Thus, according to the embodiment chosen, the etching can be carried out equally well on the float glass line, the glass sheet then being the float glass strip, and outside the float glass line, the glass sheet then being a glass plate.

The laser radiation is preferably ultraviolet radiation. Ultraviolet radiation is understood to mean radiation, the wavelength of which is within a range extending from 100 to 400 nm. This is because the use of ultraviolet radiation makes it possible to further increase the resolution of the etching, for example making it possible to obtain codes which are perfectly readable through the edge face with sizes of symbols of less than 180 µm. In addition, the inventors have been able to demonstrate that the advantages of the invention in terms of readability of the code are particularly heightened in the case of the use of ultraviolet radiation: this is because the difference in readability between a tin-face marking and an atmosphere-face marking is even greater in the case of etching by an ultraviolet laser. It is thus possible to etch small-sized codes which remain perfectly readable.

The ultraviolet radiation can in particular result from a laser chosen from:
- excimer lasers, for example an argon fluoride laser (wavelength of 193 nm),
- lasers having a YAG (yttrium aluminum garnet) or $YVO_4$ matrix, which are in particular doped with neodymium or with ytterbium, and which are coupled to a frequency tripler or quadrupler; a Nd:YAG or Nd:$YVO_4$ laser can thus be coupled to a frequency tripler, in order to produce laser radiation, the wavelength of which is 355 nm, or also to a frequency quadrupler, the radiation obtained then having a wavelength of 266 nm,
- fiber lasers doped with ytterbium.

Other lasers emitting in the ultraviolet region are, for example, argon lasers or ion (xenon, krypton) lasers, dye lasers, free-electron lasers, cerium-doped solid-state lasers or gallium nitride (GaN) laser diodes.

The laser radiation is preferably pulsed.

Femtosecond or picosecond pulsed lasers can also be used.

In a known way, the laser beam formed can be focused on the surface of the glass sheet by a focusing head, the latter preferably being provided with means for orientation of the beam, such as mirrors mounted on piezoelectric positioners.

When the etching is carried out subsequent to a cutting stage, the marking method according to the invention can comprise, prior to the etching stage, a stage of identification of the tin face of the glass sheet. This identification stage can in particular be carried out by irradiation of the faces of said glass sheet by means of ultraviolet radiation (for example using a lamp emitting at a wavelength of 254 nm) and observation, optionally visual, of the presence or absence of fluorescence radiation, the tin face being identified as the face emitting such fluorescence radiation.

A glass plate comprises two faces, or main faces, connected together by an edge face. The thickness of the edge face (thus of the glass plate) is generally between 1 and 19 mm, in particular between 2 and 6 mm, indeed even between 3 and 5 mm. The faces of the glass plate are generally rectangular in shape. The lateral dimensions of the glass plate can in particular be between 1 and 7 m, in particular between 2 and 6 m.

The glass constituting the glass sheet or plate preferably exhibits a composition of soda-lime-silica type, that is to say a composition comprising silica ($SiO_2$) as network-forming oxide and sodium (soda $Na_2O$) and calcium (lime $CaO$) oxides. This composition preferably comprises the following constituents in a content varying within the limits by weight defined below:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0. |

Other types of compositions are also possible, such as compositions of borosilicate or aluminosilicate type, which also participate in forming by the float glass method.

The symbols preferably exhibit a mean size of between 50 and 180 μm, in particular between 60 and 160 μm, indeed even between 70 and 140 μm. The symbols are most generally of substantially circular shape, their mean size then corresponding to their diameter. The mean size of the symbols can be determined in particular using a profilometer or by microscopy, for example by bright-field optical microscopy.

"Etching on the face" is generally understood to mean that the symbols are at the surface of the glass, the zone impacted by the etching being at a distance generally of less than 50 μm, indeed even 40 μm and even 30 μm, from the surface of the glass.

The symbols are preferably at at most 10 mm from an edge face of the glass sheet or plate, preferably at at most 7 mm, indeed even 5 mm and even 4 mm, from an edge face of the glass sheet or plate. Reading through the edge face is thus facilitated thereby.

The code is preferably a two-dimensional code, in particular of the Datamatrix or analogous type. Mention may be made, as nonlimiting examples, of codes of the 3-DI code, Aztex Code, Codablock, Code 1, Code 16K, Dot Code, QR Code, ezCode, BeeTagg Big, BeeTagg Landscape, DataMatrix, Maxicode, Snowflake, Verocode, BeeTagg Hexagon, BeeTagg None, ShotCode, MiniCode, Code 49, Datastrip Code, CP Code or ISS SuperCode type. The code can alternatively be a one-dimensional code, such as a bar code.

The two-dimensional code preferably exhibits dimensions of at most 5*5 $mm^2$, indeed even 4*4 $mm^2$ and even 3*3 $mm^2$ or 2*2 $mm^2$.

The code is generally a code for identification or for authentication of the glass plate. The code can, for example, store a unique identification number for the glass plate, said number being associated in a database with certain characteristics of the plate. These characteristics can, for example, be the presence of defects, their nature, size and/or position, allowing the transformer to optimize the subsequent cutting of the glass plate.

The reading method according to the invention (see FIG. 4c) preferably comprises a stage of acquisition, by means of a camera, of at least one image via the edge face of the glass plates, the direction of observation being perpendicular and inclined with respect to said edge face of each of the glass plates, the code of which has to be read with said image, and an image processing stage in which the image acquired is processed by a computer programmed so as to extract the information present in at least one code visible on the image and which has to be read. Preferably, the glass plates are positioned in a stack during the reading. The image acquisition is preferably carried out under dark-field illumination conditions.

The examples which follow nonlimitingly illustrate the invention.

Figure 4A:
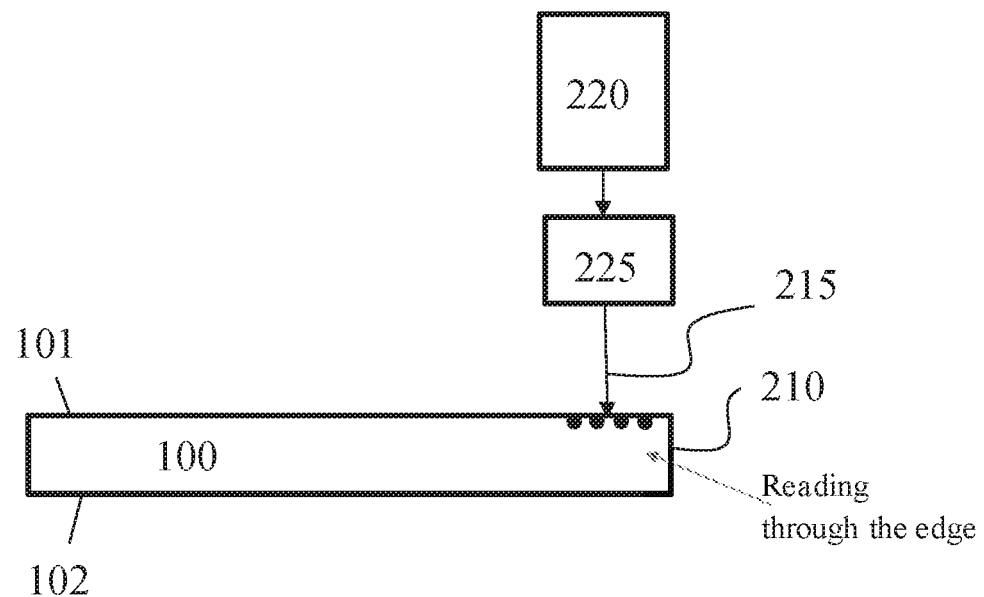
Figure 4B:
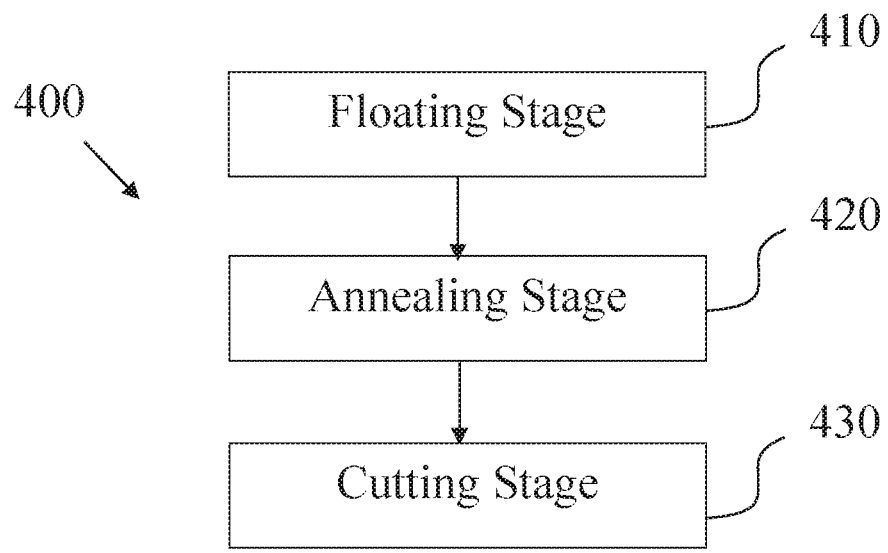
Figure 4C:
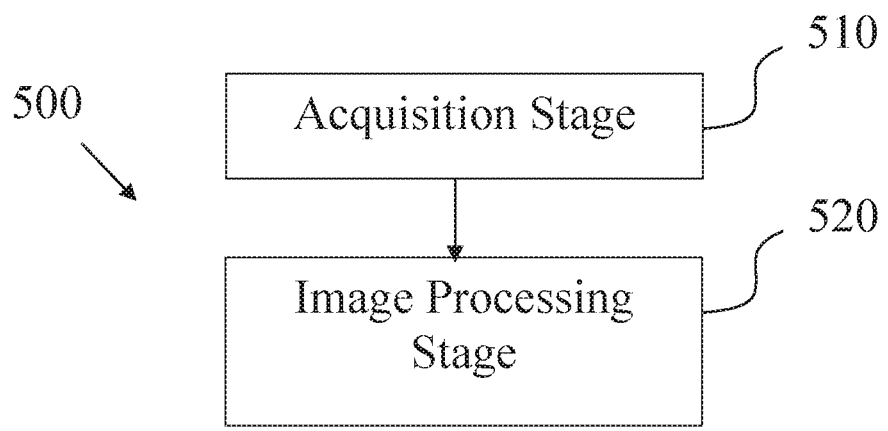

FIG. 4a is a schematic representation of a sheet of glass 100 that includes a code etched by a laser device 220, FIG. 4b is a schematic representation of a method 400 of processing a glass sheet, and FIG. 4c is a schematic representation of a method 500 of reading a code that has been etched on the glass sheet.

Figure 3:
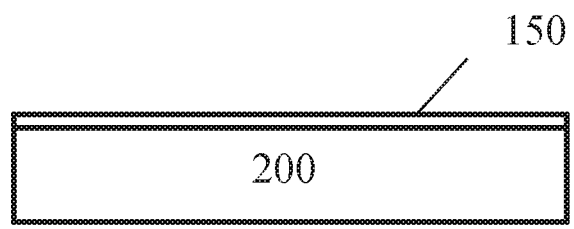
FIG. 3 is a schematic representation of molten glass 150 on a bath of molten tin 200.

A sheet of clear soda-lime-silica float glass, of the type sold by the applicant company under the Planiclear name, was subjected to irradiation by means of a UV lamp (wavelength of 254 nm), in order to identify the tin face of the sheet. As explained previously, the sheet of clear soda-lime-silica float glass is obtained by pouring molten glass 150 on a bath of molten tin 200, as schematically shown in FIG. 3. As explained above, the manufacture of float glass conventionally comprises a floating stage 410, an annealing stage 420 and a cutting stage 430, as schematically illustrated in the method 400 of FIG. 4b. Instead of using a UV lamp, the code can be etched using a laser device. FIG. 4a schematically illustrates the sheet of clear soda-lime-silica float glass 100 that includes a code 210 etched by a laser device 220. The glass sheet 100 includes a tin face 101 and an opposite face 102. The laser device 220 emits a laser radiation 215. The laser device 220 can be, for example, an excimer laser, a fiber laser or a laser having a YAG or $YVO_4$ matrix. In FIG. 4a, the laser device 220 is coupled to a frequency tripler or quadrupler 225.

In an example according to the invention, a Datamatrix code was subsequently etched on the tin face of the sheet, by means of a pulsed laser emitting ultraviolet radiation, more specifically a Nd:YVO$_4$ laser pumped using a laser diode and combined with a frequency tripler, so as to produce radiation with a wavelength of 355 nm. The code, with a total size of 3*3 mm$^2$, is formed of circular points with a diameter ranging from 50 to 120 µm, the points closest to the edge face being located at a distance of 2 mm from the latter.

In this example, the etching was carried out on the glass sheet while it was in rectilinear movement at a rate of 18 meters per minute.

In a comparative example, the same code was etched in the same way but on the atmosphere face of the glass sheet.

The codes were subsequently read via the edge face by means of a camera under an angle of approximately 30° with respect to a normal to the edge face. FIG. 4c is a schematic representation of a method 500 of reading a code that has been etched on the glass sheet. The reading method 500 includes an acquisition stage 510 and an image processing stage 520.

Figure 1:
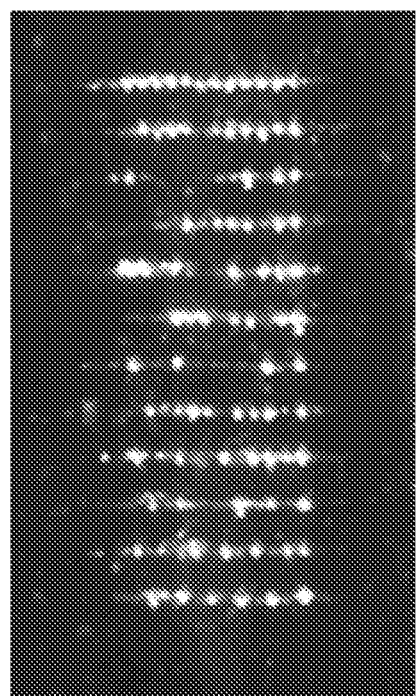
FIGS. 1 and 2 are photographs of codes displayed via the edge face, respectively for a comparative example and for an example according to the invention.

The image taken by the camera in the case of the comparative example is represented in FIG. 1. It may be seen that the quality of the image is mediocre, the points forming the code being in places discernible with difficulty from one another. It would appear that this reduced visibility of the points is due to the presence of microcracks which propagate between the points, which microcracks are invisible during face reading but which scatter the light so as to affect the reading via the edge face. The reading of the code is then difficult and can even result in reading errors.

Figure 2:
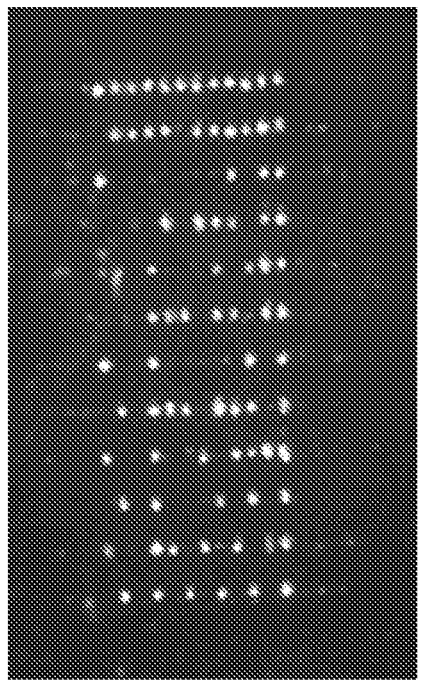

The image taken by the camera in the case of the example according to the invention is represented in FIG. 2. It is seen here that the image is of good quality, the points being well separated from one another. The reading of the code is then greatly facilitated and the risk of reading error minimized.

On the other hand, it should be noted that, seen through the face, the codes of the example according to the invention and of the comparative example do not exhibit visible differences. To the naked eye, the etching appears slightly more obvious when the etching was carried out on the atmosphere face but, in the event of reading the code through the face, no difference is observed.

Similar results were obtained in other etching tests, carried out on static glass plates.

The invention claimed is:

1. A method for obtaining a glass plate marked on a portion of one of its faces with code-forming symbols, comprising a stage of etching said symbols by means of laser radiation on a glass sheet obtained by floating on a bath of molten tin, said etching being carried out on the face which has been in contact with said bath of molten tin.

2. The method as claimed in claim 1, such that the laser radiation is ultraviolet radiation.

3. The method as claimed in claim 2, such that the ultraviolet radiation results from a laser chosen from:
   excimer lasers,
   lasers comprising a YAG (yttrium aluminum garnet) or YVO$_4$ matrix coupled to a frequency tripler or quadrupler,
   fiber lasers doped with ytterbium.

4. The method as claimed in claim 3, wherein the YAG (yttrium aluminum garnet) or YVO$_4$ matrix is doped with neodymium or with ytterbium.

5. The method as claimed in claim 1, comprising, prior to the etching stage, a stage of floating on a bath of molten tin in order to obtain said glass sheet, followed by a stage of annealing said glass sheet, followed by a cutting stage, the etching stage being carried out during the annealing stage or between the annealing stage and the cutting stage.

6. The method as claimed in claim 1, wherein the etching stage is carried out after at least one cutting stage, on glass plates of finished sizes.

7. The method as claimed in claim 1, such that the symbols are at at most 10 mm from an edge face of the glass sheet or of the glass plate.

8. The method as claimed in claim 7, such that the symbols are at at most 7 mm from an edge face of the glass sheet or of the glass plate.

9. The method as claimed in claim 1, such that the symbols exhibit a mean size of between 50 and 180 µm.

10. The method as claimed in claim 9, such that the symbols exhibit a mean size of between 60 and 160 µm.

11. The method as claimed in claim 1, such that the code is a two-dimensional code.

12. The method as claimed in claim 11, wherein the code is a Datamatrix code.

13. A glass plate obtained by the method of claim 1, formed from a glass sheet obtained by floating on a bath of molten tin, said plate being marked with code-forming symbols etched by means of laser radiation on a portion of the face which has been in contact with said bath of molten tin.

14. The glass plate as claimed in claim 13, such that the symbols are at at most 10 mm from an edge face of the plate.

15. The glass plate as claimed in claim 14, such that the symbols are at at most 7 mm from an edge face of the plate.

16. The glass plate as claimed in claim 13, such that the symbols exhibit a mean size of between 50 and 180 µm.

17. The glass plate as claimed in claim 16, wherein the symbols exhibit a mean size of between 60 and 160 µm.

18. The glass plate as claimed in claim 13, such that the code is a two-dimensional code.

19. The glass plate as claimed in claim 18, wherein the code is a Datamatrix code.

20. A method for reading, via the edge face, code-forming symbols marked on a glass plate as claimed in claim 13.

* * * * *